US012572129B2

(12) United States Patent (10) Patent No.: US 12,572,129 B2
Yeo et al. (45) Date of Patent: Mar. 10, 2026

(54) LITHOGRAPHY MODEL GENERATING METHOD BASED ON DEEP LEARNING, AND MASK MANUFACTURING METHOD INCLUDING THE LITHOGRAPHY MODEL GENERATING METHOD

(71) Applicant: SAMSUNG ELECTRONICS CO., LTD., Suwon-si (KR)

(72) Inventors: Sangchul Yeo, Suwon-si (KR); Jaewon Yang, Suwon-si (KR); Hyeok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 397 days.

(21) Appl. No.: 18/106,091

(22) Filed: Feb. 6, 2023

(65) Prior Publication Data

US 2023/0418260 A1 Dec. 28, 2023

(30) Foreign Application Priority Data

Jun. 23, 2022 (KR) ........................ 10-2022-0077085

(51) Int. Cl.
*G05B 19/4099* (2006.01)
*G05B 13/02* (2006.01)

(52) U.S. Cl.
CPC ..... *G05B 19/4099* (2013.01); *G05B 13/0265* (2013.01); *G05B 2219/45028* (2013.01)

(58) Field of Classification Search
CPC ........ G05B 2219/45028; G05B 3/0265; G05B 19/4099; G06N 3/02; G06N 3/08; G03F 1/36; G03F 7/70441; G03F 7/705
See application file for complete search history.

(56) References Cited

U.S. PATENT DOCUMENTS

| | | | | |
|---|---|---|---|---|
| 8,572,518 | B2 * | 10/2013 | Tyminski ............ | G03F 7/70641 |
| | | | | 716/54 |
| 8,910,092 | B1 | 12/2014 | Shih et al. | |
| 9,989,842 | B2 | 6/2018 | Jung et al. | |
| 10,339,695 | B2 | 7/2019 | Petkov et al. | |
| 10,552,714 | B2 | 2/2020 | Kiapour et al. | |
| 11,061,318 | B2 | 7/2021 | Lo et al. | |
| 11,079,672 | B2 | 8/2021 | Chu et al. | |
| 2007/0157139 | A1 * | 7/2007 | White ...................... | G03F 1/70 |
| | | | | 700/121 |

(Continued)

FOREIGN PATENT DOCUMENTS

KR 10-2020-0035303 A 4/2020

OTHER PUBLICATIONS

Communication issued on Jan. 15, 2026 by the Korean Ministry of Intellectual Property (MOIP) in Korean Patent Application No. 10-2022-0077085.

*Primary Examiner* — Vincent H Tran
(74) *Attorney, Agent, or Firm* — Sughrue Mion, PLLC

(57) ABSTRACT

A reliable lithography model generating method reflecting a mask bias variation and a mask manufacturing method including the lithography model generating method are provided. The lithography model generating method includes preparing basic image data for learning, preparing transform image data that indicates a mask bias variation, generating a lithography model by performing deep learning by combining the basic image data and the transform image data, and verifying the lithography model.

19 Claims, 12 Drawing Sheets

(56) References Cited

U.S. PATENT DOCUMENTS

| | | | |
|---|---|---|---|
| 2010/0010784 A1* | 1/2010 | Cao | G03F 7/70525 |
| | | | 703/1 |
| 2015/0269306 A1* | 9/2015 | Cheng | G06F 30/20 |
| | | | 716/53 |
| 2019/0147134 A1* | 5/2019 | Wang | G06F 30/20 |
| | | | 716/52 |
| 2020/0050099 A1 | 2/2020 | Su et al. | |
| 2020/0278604 A1* | 9/2020 | Lo | G03F 7/70441 |
| 2020/0380362 A1 | 12/2020 | Cao et al. | |
| 2021/0181620 A1 | 6/2021 | Poonawala et al. | |
| 2021/0191254 A1 | 6/2021 | Huang et al. | |
| 2021/0357571 A1 | 11/2021 | Tien et al. | |
| 2022/0035236 A1 | 2/2022 | Kim et al. | |
| 2022/0155695 A1* | 5/2022 | Moon | G03F 7/70533 |
| 2022/0284166 A1* | 9/2022 | Yu | G03F 7/70441 |
| 2023/0168590 A1* | 6/2023 | Sin | G03F 1/36 |
| | | | 716/53 |
| 2023/0197460 A1* | 6/2023 | Yang | G06V 10/752 |
| | | | 438/689 |
| 2023/0206112 A1* | 6/2023 | Chi | G06N 20/00 |
| | | | 716/55 |
| 2023/0314953 A1* | 10/2023 | Tsai | G03F 7/70291 |
| | | | 355/67 |

* cited by examiner

Input      Output

FIG. 4

| | 0° | 90° | 180° | 270° |
|---|---|---|---|---|
| NO SYMMETRY APPLIED | | | | |
| X SYMMETRY | | | | |
| Y SYMMETRY | | | | |

LITHOGRAPHY MODEL GENERATING METHOD BASED ON DEEP LEARNING, AND MASK MANUFACTURING METHOD INCLUDING THE LITHOGRAPHY MODEL GENERATING METHOD

CROSS-REFERENCE TO RELATED APPLICATION

This application is based on and claims priority under 35 U.S.C. § 119 to Korean Patent Application No. 10-2022-0077085, filed on Jun. 23, 2022, in the Korean Intellectual Property Office, the disclosure of which is incorporated by reference herein in its entirety.

BACKGROUND

Embodiments of the present disclosure relate to a mask manufacturing method, and more particularly, to a lithography model generating method based on deep learning, and a mask manufacturing method including the lithography model generating method.

In a semiconductor process, a photolithography process using a mask may be performed to form a pattern on a semiconductor substrate, such as a wafer. The mask may be called a pattern-transferred body having a pattern shape of an opaque material, which is formed on a transparent base layer material. To manufacture this mask, a layout of a required pattern is first designed, and then optical proximity correction (OPC)ed layout data obtained through OPC is transferred as mask tape-out (MTO) design data. Thereafter, based on the MTO design data, mask data preparation (MDP) may be performed, and processes such as an exposure process may be performed on a substrate for the mask.

SUMMARY

Embodiments of the present disclosure provide a reliable lithography model generating method reflecting a mask bias variation and a mask manufacturing method including the lithography model generating method.

In addition, problems to be solved by and solutions of embodiments of the present disclosure are not limited to the problems and solutions described above, and other problems and solutions may be clearly understood to those of ordinary skill in the art from the description below.

According to embodiments of the present disclosure, a lithography model generating method based on deep learning is provided. The lithography model generating method includes: preparing basic image data for learning; preparing transform image data that indicates a mask bias variation; generating a lithography model by performing deep learning by combining the basic image data and the transform image data; and verifying the lithography model.

According to embodiments of the present disclosure, a lithography model generating method based on deep learning is provided. The lithography model generating method includes: preparing basic image data for learning; preparing transform image data that indicates a mask bias variation; generating a lithography model by performing deep learning by combining the basic image data and the transform image data; verifying the lithography model; and adjusting a recipe with respect to the lithography model, wherein the transform image data is generated through an image augmentation method from the basic image data such that the transform image data indicates a process variation.

According to embodiments of the present disclosure, a mask manufacturing method is provided. The mask manufacturing method includes: generating a lithography model based on deep learning; generating an optical proximity correction (OPC)ed layout by performing OPC on a mask layout by using an OPC model obtained based on the lithography model; transferring the OPCed layout as mask tape-out (MTO) design data; preparing mask data based on the MTO design data; and exposing a substrate for a mask based on the mask data. The generating of the lithography model includes: preparing basic image data for learning; preparing transform image data that indicates a mask bias variation; generating the lithography model by performing deep learning by combining the basic image data and the transform image data; verifying the lithography model; and adjusting a recipe with respect to the lithography model, and wherein the lithography model includes an optical proximity correction (OPC) model or a process proximity correction (PPC) model.

BRIEF DESCRIPTION OF DRAWINGS

Embodiments of the present disclosure will be more clearly understood from the following detailed description taken in conjunction with the accompanying drawings in which:

FIG. 4 is a conceptual diagram illustrating a method of generating transform image data through a data augmentation method in the lithography model generating method of FIG. 1;

DETAILED DESCRIPTION

Figure 1:
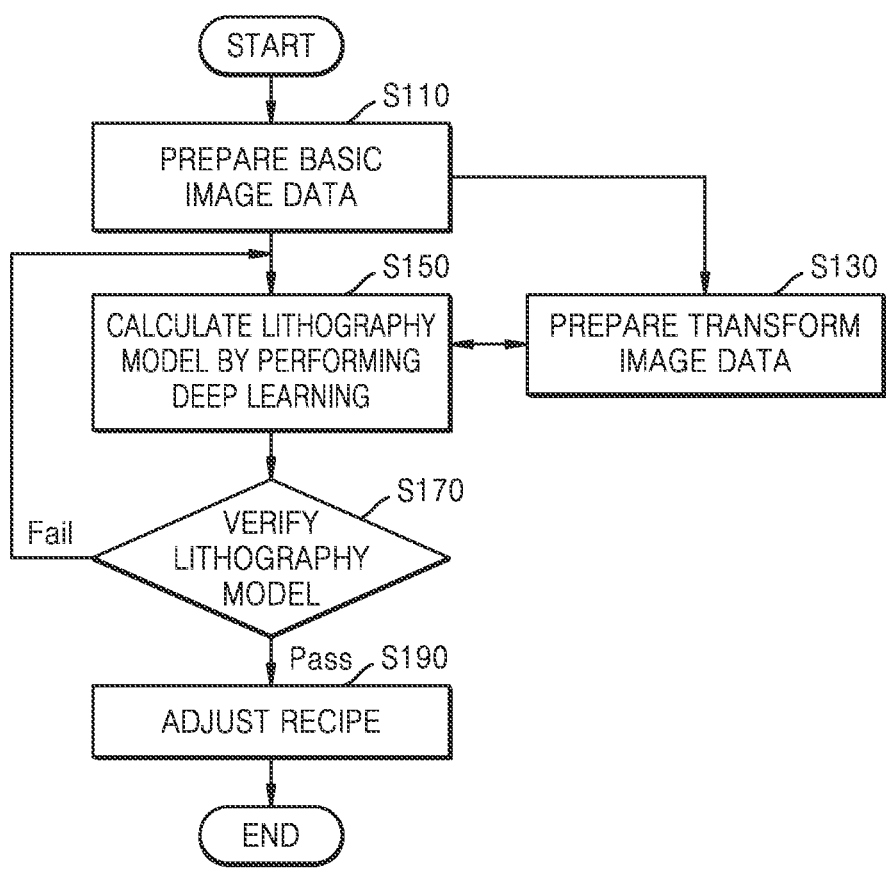
FIG. 1 is a flowchart schematically illustrating a process of a lithography model generating method based on deep learning according to an embodiment.

Hereinafter, non-limiting example embodiments of the present disclosure are described in detail with reference to the accompanying drawings. Like reference numerals in the drawings denote like elements, and their repetitive descriptions are omitted.

Figure 2A:
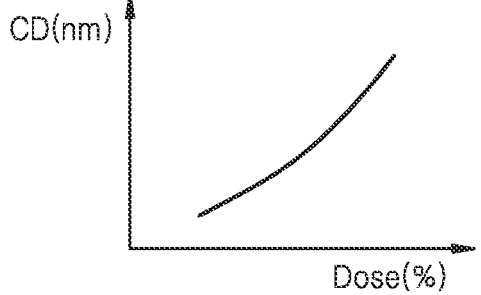
FIG. 2A is a first graph illustrating a critical dimension (CD) change with respect to a process variation.
Figure 2B:
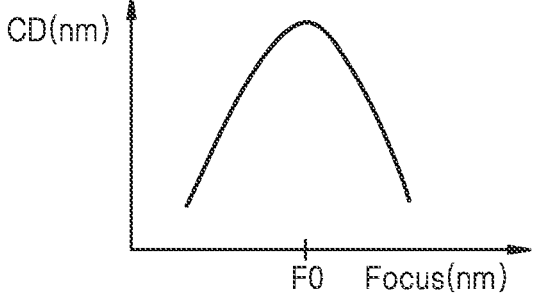
FIG. 2B is a second graph illustrating a CD change with respect to a process variation.
Figure 3:
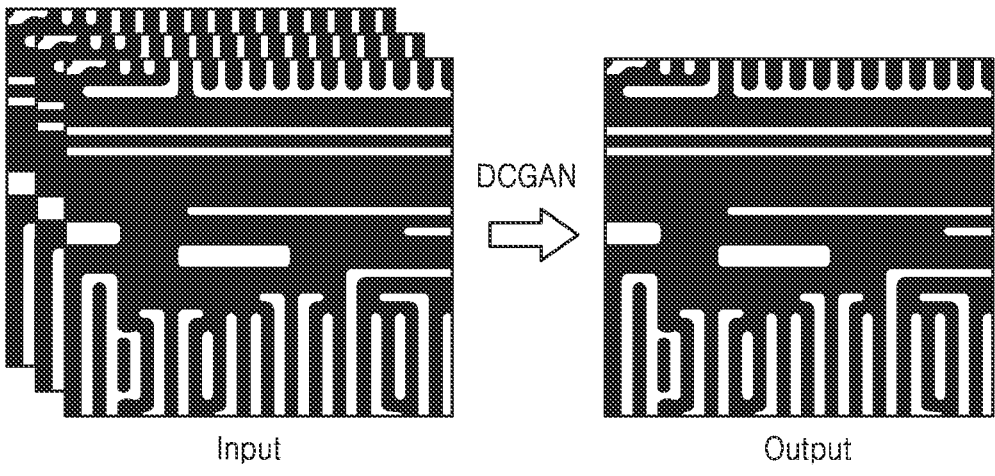
FIG. 3 is a conceptual diagram illustrating a problem of a lithography model generating method based on deep learning of a comparative example.

FIG. 1 is a flowchart schematically illustrating a process of a lithography model generating method based on deep learning according to an embodiment, FIGS. 2A and 2B are graphs illustrating a critical dimension (CD) change with respect to a process variation, and FIG. 3 is a conceptual diagram illustrating a problem of a lithography model generating method based on deep learning of a comparative example.

Referring to FIGS. 1 to 3, in the lithography model generating method based on deep learning of an embodiment of the present disclosure (hereinafter simply referred to as "lithography model generating method"), first, basic image data for learning is prepared (operation S110). Here, the basic image data may be data of a pattern image of a sample obtained through a measurement device. For example, in the lithography model generating method of the present embodiment, the basic image data may include data of an after develop inspection (ADI) contour image and an after clean inspection (ACI) contour image of a sample. Also, according to an embodiment, the basic image data may include data of a mask layout image.

The sample may be a semiconductor device used in learning, and a pattern of the sample may be formed by transferring a pattern of a mask onto the sample through an exposure process. Accordingly, first, a layout for the pattern of the mask corresponding to the pattern of the sample, that is, the mask layout, may be designed. For reference, in general, the shape of the pattern of the sample may be different from the shape of the pattern of the mask due to the nature of the exposure process. In addition, because the pattern on the mask is reduced-projected and transferred onto the substrate, the pattern of the mask may have a greater size than the pattern of the sample.

When the pattern of the mask is transferred onto the sample, a photo process and an etching process may be performed. In general, the photo process may refer to a process of forming a photoresist (PR) pattern on a sample through an exposure process and a development process. Also, the etching process may refer to a process of forming a pattern on a sample by using a PR pattern as an etch mask.

In the photo process, optical proximity correction (OPC) may be performed. As the pattern is refined, an optical proximity effect (OPE) occurs due to the influence between neighboring patterns in the exposure process, and OPC may include a method of correcting a mask layout to suppress the OPE. OPC may include a process of generating an OPC model, and a process of generating an OPCed layout through simulation using the OPC model. Accordingly, the photo process may include a process of generating an OPCed layout through OPC, a process of manufacturing a mask with the OPCed layout, and a process of forming a PR pattern on a sample through an exposure process using the mask and a developing process. Meanwhile, in the etching process, to compensate for an etch bias, process proximity correction (PPC) may be performed.

In the lithography model generating method of the present embodiment, a lithography model may be an OPC model or a PPC model generated through learning. Also, input data used for learning and output data corresponding thereto may vary depending on a process. For example, when the process is a photo process using a mask, the input data may be data of a mask layout image, and the output data may be data of an ADI contour image of a sample or data of an OPCed layout image. In addition, when the process is an etching process using a PR pattern, the input data may be data of an ADI contour image of the sample, and the output data may be data of an ACI contour image of the sample.

After preparing the basic image data, transform image data reflecting a mask bias variation is prepared (operation S130). The mask bias variation may include a process variation such as a dose or focus variation of an exposure process, or an anchor pattern variation. Here, the anchor pattern may include a pattern representing patterns in the mask with respect to a shape and a position. As shown in the graphs of FIGS. 2A and 2B, a CD increases as the dose increases in the exposure process. In addition, the CD decreases as a focus moves away from a normal focus FO in the exposure process. Therefore, in order to be a reliable lithography model, such a mask bias variation may need to be reflected in the lithography model.

The transform image data may include image data corresponding to the mask bias variation, that is, the process change. In the lithography model generating method of the present embodiment, instead of preparing actual image data corresponding to each process variation, image data transformed from the basic image data through a data augmentation method is prepared as the transform image data. A process of obtaining the transform image data from the basic image data through the data augmentation method is described in more detail with reference to FIG. 4.

After preparing the transform image data, deep learning is performed by combining the basic image data and the transform image data and a lithography model is calculated (operation S150). Here, deep learning may be performed using deep convolutional generative adversarial networks (DCGAN). A structure of the DCGAN is described in more detail with reference to FIG. 6.

In the lithography model generating method of the present embodiment, deep learning may be performed by combining the basic image data and the transform image data. In addition, deep learning may be performed while changing a combination for each iteration by applying a weight to the basic image data and the transform image data. Here, the basic image data and the transform image data may be appropriately combined and used for deep learning so as to minimize a learning time while generating an optimized lithography model.

For example, when at least 100 pieces of image data are used to generate an optimal lithography model, in the lithography model generating method of the present embodiment, deep learning may be performed by combining the image data and the transform image data such that 100 pieces of image data are obtained. In addition, deep learning may be performed while changing the combination for each iteration. For example, in a first iteration, 80 pieces of basic image data, 10 first transform image data, and 10 pieces of second transform image data may be used for deep learning, and in a second iteration, 70 pieces of basic image data, 20 pieces of first transform image data, and 10 pieces of second transform image data may be used for deep learning. Here, the first transform image data and the second transform image data may correspond to image data having different variation values. The combination of the basic image data and the transform image data, and deep learning according thereto are described in more detail with reference to FIGS. 5 to 8B.

On the other hand, a weight is a factor that gives the influence or responsiveness of image data with regard to learning. For example, in the lithography model generating method of the present embodiment, a weight of 0.7 may be allocated to the basic image data having a great influence, and weights of 0.2 and 0.1 may be respectively allocated to the first transform image data and the second transform image data having a relatively little influence. However, weight allocation values are not limited thereto. On the other hand, once the weights are assigned, the weights may be maintained in all iterations. However, according to an embodiment, the weights may be changed for each iteration.

In the lithography model generating method of the present embodiment, the lithography model is a model generated in learning through the DCGAN, and may be an OPC model or a PPC model. In other words, according to the input data and the output data, the lithography model may be the OPC model or the PPC model. For example, when the lithography model is the OPC model, the input data may be data of a mask layout image, and the output data may be data of an ADI contour image of a sample, or data of an OPCed mask layout image. In addition, when the lithography model is the PPC model, the input may be data of the ADI contour image of the sample, and the output may be data of the ACI contour image of the sample.

After generating the lithography model, verification of the lithography model is performed (operation S170). When verification is passed (Pass), the process proceeds to operation S190 of adjusting a recipe, and when verification is not passed (Fail), the process proceeds to operation S150 of generating the lithography model.

Verification of the lithography model may be generally performed with an error root mean square (RMS). For example, when the error RMS is greater than a set reference value by comparing image data output through the lithography model with reference image data, verification may not be passed, and when the error RMS is less than or equal to the reference value, verification may be passed. Here, the error RMS may be, for example, the error RMS with respect to the CD. According to an embodiment, verification may be performed using an edge placement error (EPE).

When verification of the lithography model is passed (Pass), the recipe of the lithography model is adjusted (operation S190). When the lithography model is the OPC model, a recipe of the OPC model may be adjusted, and when the lithography model is the PPC model, a recipe of the PPC model may be adjusted. In other words, when the lithography model is the OPC model, some of recipes constituting the existing OPC model may be changed based on the generated lithography model. In addition, when the lithography model is the PPC model, some of recipes constituting the existing PPC model may be changed based on the generated lithography model. Through such an adjustment of the recipe, a final lithographic model, that is, the OPC model and/or the PPC model, may be completed.

In the lithography model generating method of the present embodiment, the transform image data reflecting the mask bias variation may be automatically generated from the basic image data through the data augmentation method. In addition, the learning time may be minimized by performing deep learning while changing the combination for each iteration by applying the weights to the basic image data and the transform image data. Furthermore, a reliable lithography model that responds to the mask bias variation may be generated, by adding the transform image data reflecting the mask bias variation to a deep learning system. As a result, the lithography model generating method of the present embodiment may make it possible to manufacture a reliable mask capable of accurately forming a required pattern on a semiconductor device based on the reliable lithography model.

In a more general description of the mask, in order to pattern a semiconductor device in a semiconductor process, it may be necessary to manufacture the mask for a lithography process. Mask manufacture starts by generating a lithography model, generates an OPCed layout image through simulation such as OPC/PPC, and undergoes a mask tape-out (MTO) process to manufacture the final mask by a mask manufacturing team. A mask manufacturing method is described in more detail with reference to FIG. 9.

The quality of the mask affects patterning matching of the semiconductor device, and, in particular, the accuracy of the lithography model may be the most important factor in the quality of the mask. Accordingly, in order to improve the accuracy of the lithography model, artificial intelligence (AI) technology may be applied to OPC. For example, a large number of images may be trained through deep learning to generate the lithography model. On the other hand, the lithography model may need to have predictive power for various process variations. Among the process variations, the mask bias variation is typical. As described above, the mask bias variation may include process conditions with respect to variations in dose and focus in the exposure process, a variation in an anchor pattern, etc.

In the case of general lithography model based on deep learning, while an improved result is shown in terms of accuracy, there is a problem of low reliability in terms of predictability of mask bias variations in a comparative embodiment. In the lithography model based on deep learning, in order to improve the predictability of process variations, information about process variations may be added to a deep learning process. However, in deep learning, when all data of process variations is transformed into image data and input to deep learning, it may encounter a time limit in learning due to a huge increase in input data.

Specifically, in a lithography model generating method based on deep learning according to a comparative embodiment, in order to improve the responsiveness to mask bias variations, a method of generating a basic lithography model with respect to the basic image data, adding image data of the mask bias variation (hereinafter, referred to as a "mask bias split") again, and compensating for the lithography model is performed. However, such a method is very disadvantageous in terms of efficiency of the learning time because the learning time is multiplied by a multiple of the mask bias split. For example, referring to FIG. 3, when one sheet corresponds to the basic image data in input data Input and the remaining two sheets correspond to the mask bias split, in order to reflect the mask bias variation, the input data Input may be increased to three times the base image data. Accordingly, three times the learning time may be required to calculate the appropriate output data Output and the lithography model, even when the arithmetic calculation is simply performed. In addition, considering the time for preparing the mask bias split, it may take more time to calculate the lithography model.

However, in the lithography model generating method of the present embodiment, the transform image data in response to the mask bias variation may be automatically generated based on the data augmentation method. In addition, by performing deep learning by applying weights while dynamically and randomly combining the basic image data and the transform image data for each iteration, the learning time may be minimized, and the reliable lithography model that reflects the error due to the mask bias variation may be generated.

FIG. 4 is a conceptual diagram illustrating a method of generating transform image data through a data augmentation method in the lithography model generating method of FIG. 1.

Referring to FIG. 4, the data augmentation method refers to a method of generating a new image by applying an appropriate modification to an original image. For example, in the lithography generation method of the present embodiment, the transform image data may be generated by applying an appropriate modification to basic image data through the data augmentation method.

As a specific example, the data augmentation method may generate a new image by slightly moving the original image up, down, left and right, slightly rotating the original image, slightly tilting the original image, slightly enlarging or reducing the original image, etc. In addition, the data augmentation method may significantly increase the number of pieces of image data, by generating a new image by combining at least two transformations of slight translation, slight rotation, slight tilting, slight enlargement, and slight reduction of the original image.

FIG. 4 illustrates the method of generating the new image by rotation, symmetry, or combination of rotation and symmetry of the original image. For example, the new image may be generated by rotating the original image by 90 degrees, 180 degrees, or 270 degrees. In addition, the new image may be generated through X-axis symmetry or Y-axis symmetry of the original image. Furthermore, the new image may be generated by combining any one of 90 degree rotation, 180 degree rotation, and 270 degree rotation of the original image, and any one of X-axis symmetry and Y-axis symmetry of the original image.

In FIG. 4, the concept of generating the new image through the data augmentation method has been described with the concept of rotation at an interval of 90 degrees and symmetry of the X and Y axes, but generation of the new image through the data augmentation method is not limited thereto. For example, the generation of the new image through the data augmentation method may include generation of the new image by fine rotation, fine horizontal/vertical translation, fine enlargement/reduction, etc. For example, in the lithography generating method of the present embodiment, the transform image data may be generated from the basic image data through fine horizontal/vertical translation or fine enlargement/reduction by the data augmentation method.

Meanwhile, the new image may be automatically generated from the original image through the data augmentation method. For example, in a tool (e.g., a computer) with respect to the data augmentation method, when a user selects at least one of rotation, symmetry, translation, enlargement, or reduction, sets parameter values to be applied, and then inputs the original image to the tool, the new image is automatically generated. As a specific example, in the tool with respect to the data augmentation method, when the user selects enlargement and reduction, sets a parameter value of 1 nm, and then inputs a basic image to the tool, a new image corresponding to ±1 nm with respect to the basic image may be automatically generated.

Figure 5:
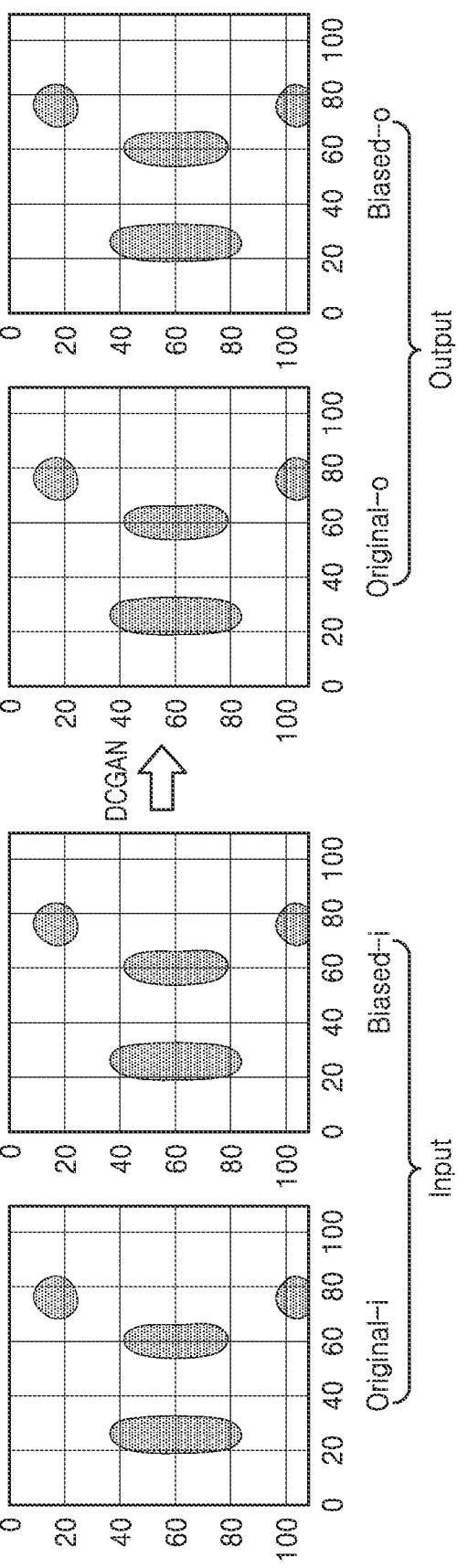
FIG. 5 is a conceptual diagram illustrating the lithography model generating method of FIG. 1 through deep convolutional generative adversarial networks (DCGAN)

FIG. 5 is a conceptual diagram illustrating the lithography model generating method of FIG. 1 through DCGAN.

Referring to FIG. 5, in the lithography model generating method of the present embodiment, a lithography model may be generated, by performing deep leaning using a combination of basic image data Original-i and transform image data Biased-i as the input data Input, and basic image data Original-o and transform image data Biased-o respectively corresponding thereto as the output data Output. As described above, an appropriate number of the basic image data Original-i and the transform image data Biased-i may be used as the input data Input through a combination, and the combination may be changed for each iteration. In addition, weights with respect to the basic image data Original-i and the transform image data Biased-i may be fixedly set or may be set differently for each iteration.

As described above, in the lithography model generating method of the present embodiment, the transform image data reflecting a mask bias variation may be generated through a data augmentation method, and deep learning may be performed by dynamically combining the basic image data and the transform image data for each iteration and applying appropriate weights. Accordingly, a reliable lithography model that recognizes and responds to the mask bias variation may be generated.

Figure 6:
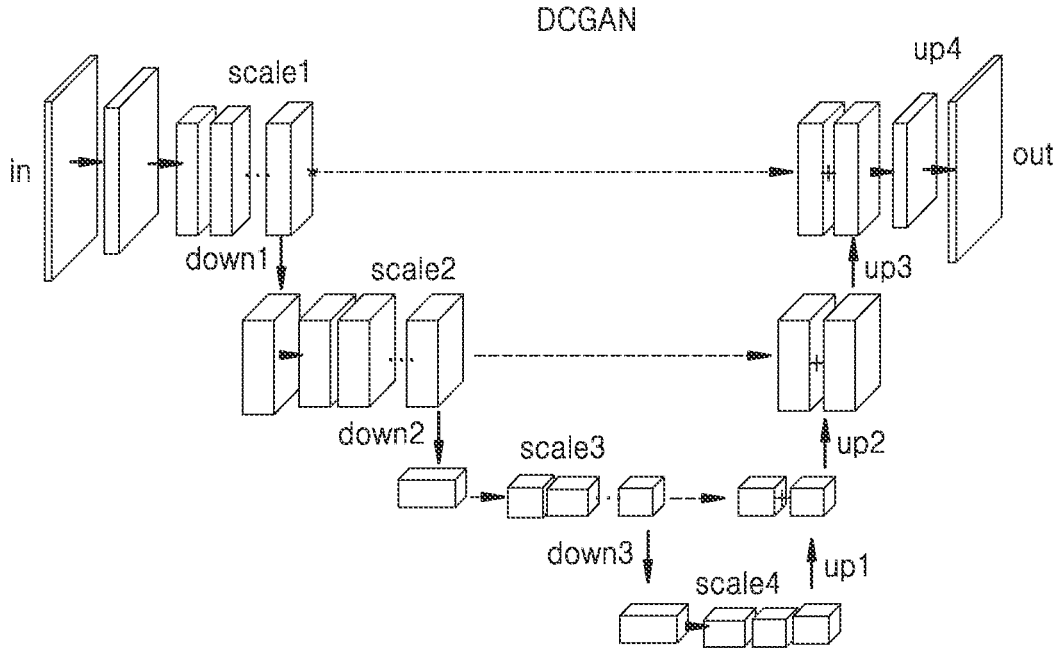
FIG. 6 is a block diagram illustrating a structure of DCGAN used in the lithography model generating method of FIG. 1.

FIG. 6 is a block diagram illustrating a structure of DCGAN used in the lithography model generating method of FIG. 1.

Referring to FIG. 6, before describing the structure of DCGAN, briefly describing GAN, GAN is a generative algorithm based on deep learning, and may include two sub-models. That is, the GAN may include a generator model and a discriminator model. The generator model may correspond to a lithography model in the lithography model generating method of the present embodiment. The generator model generates new examples, and the discriminator model determines whether a generated example is actual data or fake data generated by the generator model.

For example, with respect to the lithography model generating method of the present embodiment, the generator model may transform an input image to generate an output image corresponding to an image after OPC or PPC. For example, in an OPC process, an input image provided to the generator model may be a mask layout image, and an output image from the generator model may be an ADI contour image or an OPCed layout image. In addition, in a PPC process, an input image provided to the generator model may be an ACI image, and an output image from the generator model may be an ADI contour image.

An output image generated by the generator model and a reference image may be input to the discriminator model. Here, the reference image may correspond to a final image, which an output image is supposed to reach. For example, when an output image is an ADI contour image, the reference image may be a target PR pattern image on an actual substrate. In addition, when an output image is an ACI contour image, the reference image may be a target pattern image on an actual substrate. The discriminator model compares an output image with the reference image and determines whether the output image is an actual image or a fake image generated by the generator model. In other words, the discriminator model may determine that an output image is an actual image when the output image is substantially the same as the reference image, and determine that the output image is a fake image when the output image differs from the reference image.

Specifically, for example, when a mask layout image is input to the generator model as an input image, the generator model generates an output image, which is an ADI contour image. Thereafter, the output image and the reference image are input to the discriminator model. Here, the reference image may correspond to a target PR pattern image on an actual substrate. Thereafter, the discriminator model determines whether the output image is the same as the reference image. For example, the discriminator model determines whether an ADI contour image generated by the generator model is the same as a target PR pattern image on an actual substrate. Thereafter, according to a result of the determination, the generator model and the discriminator model are continuously updated. When the discriminator model cannot discriminate the output image OPI from the reference image RI any more according to repeating this procedure described above, deep learning ends, and the generator model at this time point may be adopted as a final lithography model. When deep learning ends, the discriminator model is discarded.

In the lithography model generating method of the present embodiment, in order for the generator model of the GAN, i.e., a lithography model, to generate a relatively accurate image, features may be accurately extracted from input images. To extract the features, a convolution process, as shown in FIG. 6, may be included. Accordingly, in the lithography model generating method of the present embodiment, the GAN may be the DCGAN. The convolution process is performed using a convolution filter and may include a down-sampling process and an up-sampling process. In addition, for relatively accurate learning, residual learning may be included between the down-sampling process and the up-sampling process. Through the residual learning, an optical effect of a peripheral region may be reflected.

In the lithography model generating method of the present embodiment, an input image may be down-sampled multiple times to obtain, for example, a one-time down-sampled image down1, a two times down-sampled image down 2, and a three times down-sampled image down3, and up-sampled multiple times to obtain a one time up-sampled image up1, a two times up-sampled image up2, a three times up-sampled image up3, and a four times up-sampled image up4, such that there are different scales provided (e.g., scale1, scale2, scale3, scale4). According to embodiments, the three times down-sampled image down3 may be used for residual learning, then up-sampled, concatenated with a previous image having undergone residual learning, and up-sampled. The number of times down-sampling is not limited to three. For example, according to an embodiment, residual learning may be performed with each image having undergone down-sampling once or twice, or down-sampling four times or more.

In the lithography model generating method of the present embodiment, the DCGAN may include a plurality of down-sample layers to have a structure reflecting a pixel correlation up to a far distance. Every time an input image passes through a down-sample layer, the input image may be reduced to a half size at an output layer. However, because a reduced image still implies pattern information corresponding to the same width as the width of the input image, information represented by one pixel may correspond to two times (or four times in an area concept) of that of the input image. As a result, even though kernels of the same size are used, a kernel applied to an image having passed through a greater number of down-sample layers may represent a pixel correlation of a wider region.

In addition, with respect to residual learning, although a residual block first structure is used in FIG. 6, a residual block last structure may be used instead. Residual learning is performed after down-sampling in the residual block first structure, whereas down-sampling may be performed after residual learning in the residual block last structure. Although image synthesis may be performed using a concatenation layer structure, the image synthesis may be performed using a sum-fusion layer structure. The concatenation layer structure has a twice larger structure in a channel direction, and thus, a kernel is also larger, and a greater number of parameters are included. On the contrary, the sum-fusion layer structure is generated through an elementwise sum, and thus, an output result of a similar performance may be obtained while maintaining a small-sized kernel.

Figure 7A:
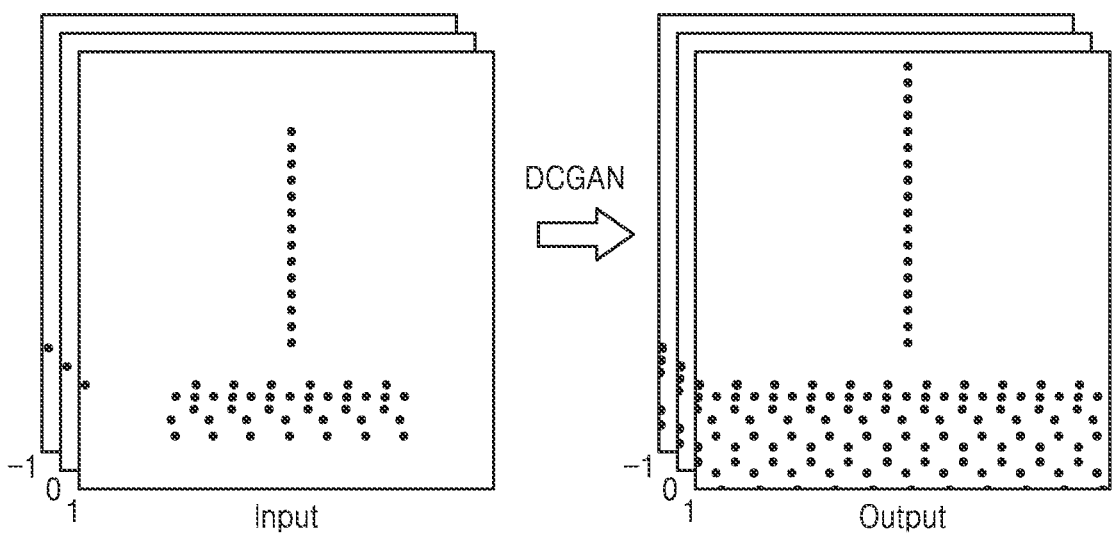
FIG. 7A is a conceptual diagram illustrating a method of reflecting a mask bias variation in a lithography model generating method of the comparative example.
Figure 7B:
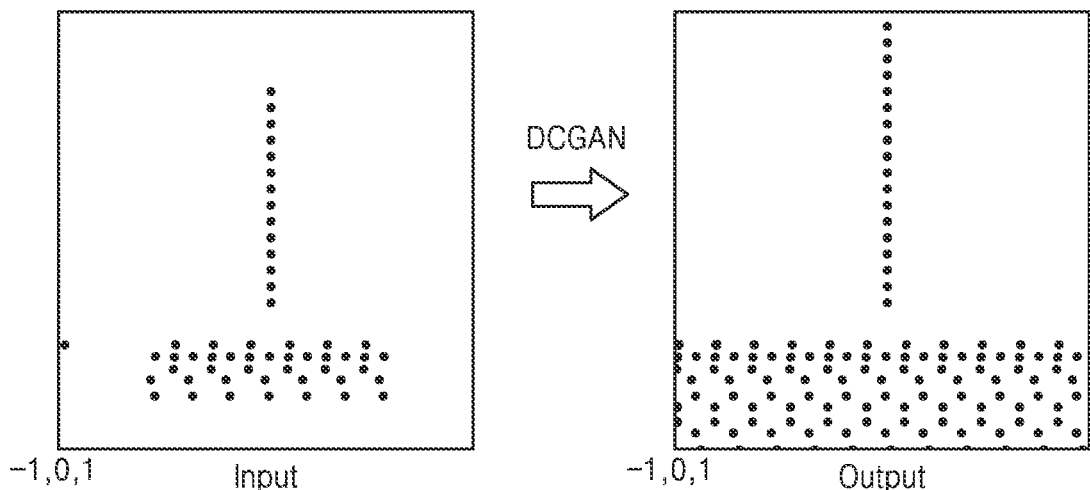
FIG. 7B is a conceptual diagram illustrating a method of reflecting a mask bias variation in a lithography model generating method of the lithography model generating method of an embodiment of the present disclosure.

FIGS. 7A and 7B are conceptual diagrams respectively illustrating a method of reflecting a mask bias variation in a lithography model generating method of the comparative example and the lithography model generating method of the present embodiment.

Referring to FIG. 7A, 0 is a sheet with respect to basic image data of a CD size, −1 is a sheet with respect to first additional image data of a CD size as small as 1 nm, and 1 is a sheet with respect to second additional image data of a CD size as large as 1 nm. In the lithography model generating method of the comparative example, deep learning is performed by preparing all image data with respect to a CD size change. In other words, in order to reflect the mask bias variation related to the CD size change, a lithography model is generated by preparing the basic image data 0, the first additional image data −1, and the second additional image data 1 as the input data Input and performing deep learning.

Meanwhile, as may be seen from FIG. 7A, in response to each of the basic image data 0, the first additional image data −1, and the second additional image data 1 of the input data Input, the output data Output of each of the basic image data 0, the first additional image data −1, and the second additional image data 1 is obtained. For reference, the CD size change may be due to a process variation such as a dose variation and a focus variation as mentioned above.

As described above, in the case of the lithography model generating method of the comparative example, in order to reflect the mask bias variation, deep learning is performed by preparing all additional image data related to the process variation. Therefore, in the lithography model generating method of the comparative example, a deep learning time may increase by an amount of additional image data. For example, when the same number of pieces of additional image data as that of the basic image data is prepared per parameter of the process variation, in the case of the CD size change, the input data Input may increase three times, and accordingly, the deep learning time may also increase three times.

Referring to FIG. 7B, in the case of the lithography model generating method of the present embodiment, the first transform image data −1 corresponding to a CD size decrease and the second transform image data 1 corresponding to a CD size increase may be automatically generated through a data augmentation method without separately preparing the first transform image data −1 and the second transform image data 1. In addition, in deep learning, the basic image data 0, the first transform image data −1, and the second transform image data 1 are not all used but may be combined with each other and used for deep learning by the number of pieces of basic image data 0.

For example, when the number of the basic image data 0 is 100, 100 pieces of first transform image data −1 and 100 pieces of second transform image data 1 each may be generated by the data augmentation method. However, in deep learning, all of 300 pieces of data are not used as the input data Input, but 100 pieces of data by a combination of 80 pieces of basic image data 0, 10 pieces of first transform image data −1, and 10 pieces of second transform image data 1 may be used as the input data Input. On the other hand, in deep learning, a weight is applied to each piece of data, and the combination may be changed for each iteration. In other words, a weight of 0.8 may be allocated to the basic image data 0, a weight of 0.1 to the first transform image data –1, and a weight of 0.1 to the second transform image data 1. Also, the combination may be changed, such as (80, 10, 10) in a first iteration, (70, 20, 10) in a second iteration, and (85, 5, 10) in a third iteration.

As a result, in the lithography model generating method of the present embodiment, deep learning is performed with the same number of pieces of data as the number of pieces of basic image data, and thus, deep learning may be performed with substantially the same time as the time taken to perform deep learning with the basic image data. In addition, the lithography model generating method of the present embodiment may generate a reliable lithography model that actively responds to the mask bias variation, by adding the transform image data reflecting the mask bias variation to deep learning.

TABLE 1 below shows an amount of data of a learning image and a verification image used for deep learning in the lithography generating method of the comparative example and the lithography model generating method of the present embodiment with respect to a metal contact of a DRAM product. For reference, a lithography model generated by the lithography model generating method of each of the comparative example and the present embodiment may be a PPC model.

In TABLE 1, "Ref" means a lithography model generating method that does not reflect the mask bias variation, "Com." means the lithography model generating method of the comparative example, and "Emb." means the lithography model generating method of the present embodiment. In addition, the "learning image" means the number of pieces of image data used for deep learning, and the "verification image" means the number of pieces of image data used for verification of the lithography model. Meanwhile, in the case of Com., as described above with reference to FIG. 7A, additional image data in which the CD size is changed by ±1 nm is used for deep learning.

TABLE 1

| | learning image | verification image |
| --- | --- | --- |
| Ref. | 1,735 | 442 |
| Com. | 5,205 (±1 nm) | 442 |
| Emb. | 1,735 | 442 |

As may be seen from TABLE 1, Com. uses more image data three times for deep learning than Ref, whereas Emb. may use the same number of pieces of image data as that of Ref for deep learning. Meanwhile, the verification image is image data used for verification after generating the lithography model, and may all be set to the same number. For example, in TABLE 1, all of verification images are set to 442.

TABLE 2 below shows the effect on the lithography model in relation to TABLE 1 above. The meaning of "Ref.," "Com.," and "Emb." may be the same as in TABLE 1.

TABLE 2

| | Cal. errRMS | Val. errRMS | learning time | note |
| --- | --- | --- | --- | --- |
| Ref. | 0.24 | 0.307 | 27 h | |
| Com. | 0.235 | 0.212 | 82 h | |
| Emb. | 0.238 | 0.216 | 27 h | three times |

TABLE 2-continued

| Cal. errRMS | Val. errRMS | learning time | note |
| --- | --- | --- | --- |
| | | | reduction in learning time |

In [TABLE 2], "errRMS" may indicate an error RMS value with respect to a CD, "Cal." may indicate image data adjusted through deep learning, and "Val." may indicate verification image data. It may be seen that because Cal. is not a result by a final lithography model, error RMSs of Ref., Com., and Emb. show similar results. On the other hand, it may be seen that Val. is a result by the final lithography model, Ref that does not consider the mask bias variation has a relatively great error RMS, and Com. and Emb. have an almost similar error RMS. On the other hand, with regard to the learning time, it may be seen that Ref and Emb. have the substantially the same learning time, and Com. has three times or more learning time. In conclusion, in the case of the lithography model generating method of the present embodiment, the learning time may be reduced by a multiple of the data increased in Com. while having the same effect as that of Com.

Figure 8A:
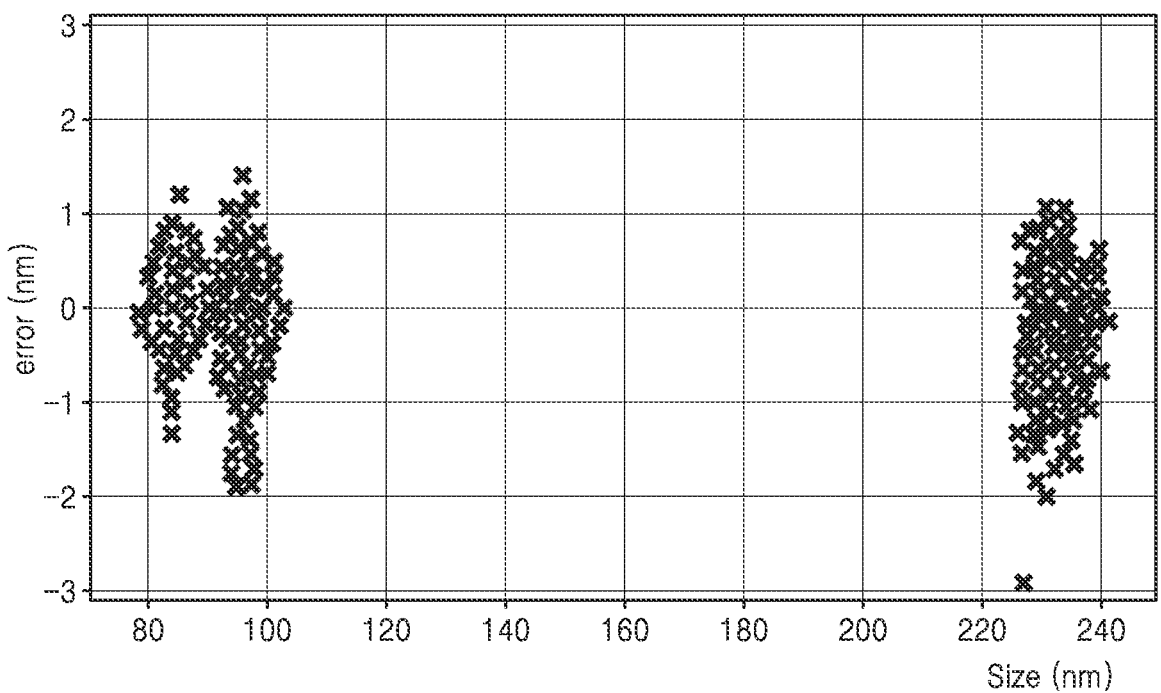
FIG. 8A is a graph illustrating an error root mean square (RMS) and an error range with respect to a metal contact of a DRAM product in a lithography model generating method that does not reflect the mask bias variation.
Figure 8B:
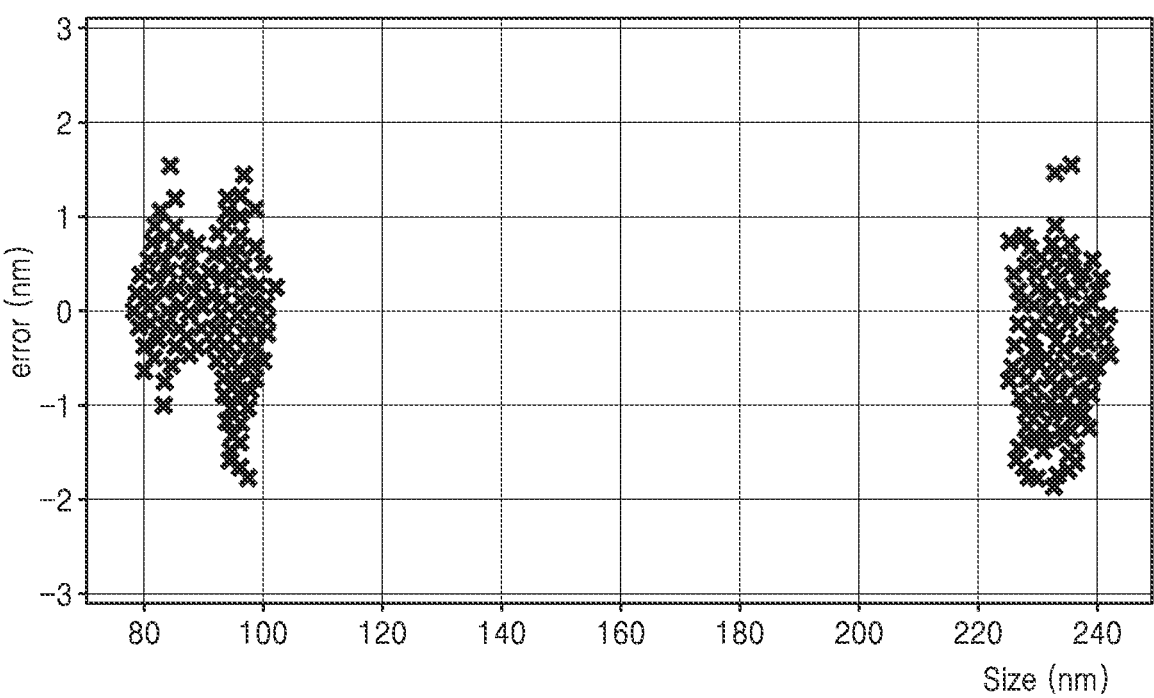
FIG. 8B is a graph illustrating an RMS and an error range with respect to a metal contact of a DRAM product in the lithography model generating method of an embodiment of the present disclosure.

FIGS. 8A and 8B are graphs illustrating an error RMS and an error range with respect to a metal contact of a DRAM product in a lithography model generating method that does not reflect the mask bias variation and the lithography model generating method of the present embodiment. In the graphs of FIGS. 8A and 8B, a part 80-100 may correspond to a CD of a short axis of the metal contact, and a part 220-240 may correspond to a CD of a long axis of the metal contact.

Referring to FIG. 8A, in the lithography model generating method of the comparative example that does not reflect the mask bias variation, the error RMS with respect to a verification image is about 0.307, and the error range is about 4.3 nm. On the other hand, Referring to FIG. 8B, in the lithography model generating method of the present embodiment, the error RMS with respect to the verification image is about 0.246, and the error range is about 3.0 nm. As a result, it may be confirmed that a reliable lithography model reflecting the mask bias variation may be generated through the lithography model generating method of the present embodiment.

Figure 9:
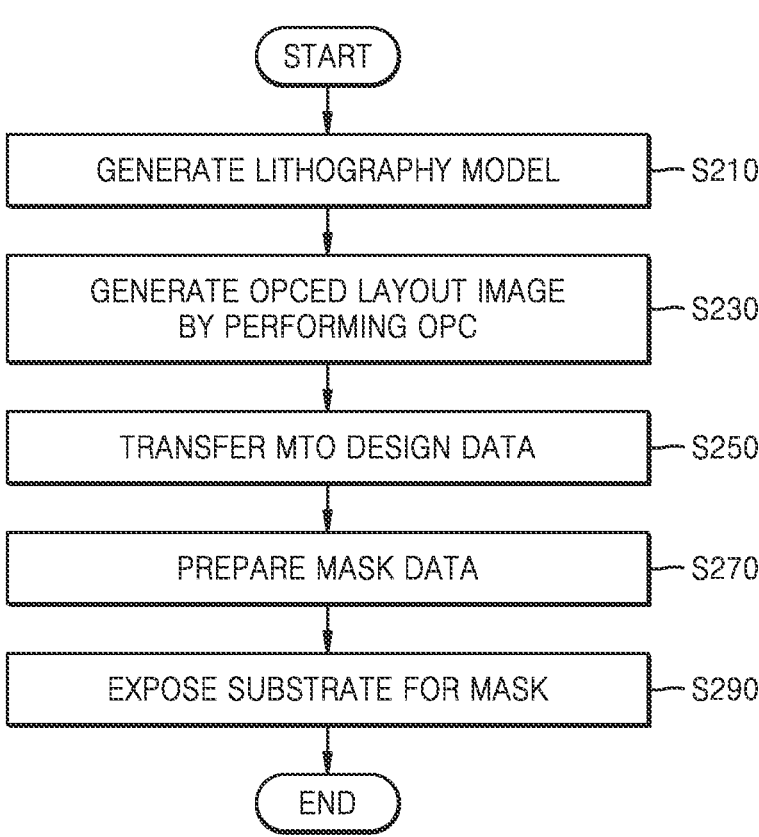
FIG. 9 is a flowchart schematically illustrating a mask manufacturing method including a lithography model generating method according to an embodiment.

FIG. 9 is a flowchart schematically illustrating a mask manufacturing method including a lithography model generating method according to an embodiment. The mask manufacturing method is described with reference to FIG. 1, and descriptions already given with reference to FIG. 1 are briefly provided or omitted.

Referring to FIG. 9, in the mask manufacturing method including the lithography model generating method (hereinafter, simply "mask manufacturing method") of the present embodiment, first, a lithography model is generated (operation S210). Operation S210 of generating the lithography model may be substantially the same as the lithography model generating method of FIG. 1. For example, Operation S210 of generating the lithography may include a basic image data preparation operation, a transform image data preparation operation, a lithography model calculation operation by performing deep learning, a lithography model verification operation, and a recipe adjustment operation. In addition, in the transform image data preparation operation, the transform image data is obtained through the data augmentation method, and in the lithography model calculation operation, deep learning is performed by combining the basic image data and the transform image data, while changing a combination for each iteration by applying weights.

After generating the lithography model, an OPCed layout image with respect to a mask layout image is generated by performing OPC (operation S230). Here, the OPC may indicate general OPC. The general OPC may include a method of adding sub-lithographic features, called serifs, or SRAFs, such as scattering bars, onto a corner of a pattern in addition to a shape change in a layout of a pattern.

Performing OPC may include first preparing basic data for the OPC, generating an optical OPC model, generating an OPC model with respect to a PR, etc. A combination of the optical OPC model and the OPC model with respect to the PR is generally called an OPC model. Meanwhile, the lithography model may be used prior to generation of the OPC model. For example, the lithography model may be used for recipe adjustment of the OPC model. After the OPC model is generated, an OPCed layout image may be generated by performing simulation using the OPC model on the mask layout image.

Thereafter, the OPCed layout image is transferred to a mask manufacturing team as MTO design data (operation S250). In general, MTO may indicate transferring final mask data obtained by an OPC method to the mask manufacturing team to request mask manufacturing. Therefore, the MTO design data may be substantially the same as data of the OPCed layout image obtained through OPC. The MTO design data may have a graphic data format used in electronic design automation (EDA) software, etc. For example, the MTO design data may have a data format, such as graphic data system II (GDS2) or open artwork system interchange standard (OASIS).

On the other hand, before transferring the OPCed layout image as the MTO design data to the mask manufacturing team, an optical rule check (ORC) on the OPCed layout image may be performed. The ORC may include, for example, RMS with respect to a CD error, EPE, a pinch error, a bridge error, etc. However, items inspected by the ORC are not limited to the above items. The OPCed layout image that has passed the ORC may be transferred to the mask manufacturing team as the MTO design data.

Thereafter, mask data preparation (MDP) is performed (operation S270). The MDP may include, for example, i) format transform called fracturing, ii) augmentation of a barcode for mechanical reading, a standard mask pattern for inspection, a job deck, etc., and iii) validation in an automatic and manual manners. Herein, the job deck may indicate generating a text file related to arrangement information of multi-mask files, a reference dose, and a series of instructions related to an exposure speed and scheme etc.

In addition, the format transform, i.e., fracturing, may indicate a process of fracturing the MTO design data for each region to change in a format for an electron beam writer. Fracturing may include a data operation of, for example, scaling, data sizing, data rotation, pattern reflection, color inversion, etc. In transforming through fracturing, data related to many systematic errors, which may occur somewhere during transferring from design data to an image on a wafer, may be corrected. The data correction of the systematic errors is called mask process correction (MPC) and may include, for example, line width adjustment, called CD adjustment, a work for increasing pattern arrangement precision, etc. Therefore, fracturing may contribute to improvement of the quality of a final mask, and may also be a process performed in advance to correct a mask process. Herein, the systematic errors may be caused by distortion occurring in an exposure process, a mask development and etching process, a wafer imaging process, etc.

The MDP may include MPC. The MPC indicates a process of correcting an error, i.e., a systematic error, occurring during an exposure process, as described above. Herein, the exposure process may be a concept generally including electron beam writing, development, etching, baking, etc. In addition, data processing may be performed before the exposure process. The data processing is a kind of pre-processing on mask data and may include grammar check on the mask data, exposure time prediction, etc.

After performing the MDP, a substrate for a mask is exposed to light based on the mask data (operation S290). Here, the exposure may indicate, for example, electron beam writing. Here, the electron beam writing may be performed by, for example, a gray writing scheme using a multi-beam mask writer (MBMW). Alternatively, the electron beam writing may be performed using a variable shape beam (VSB) writer.

In addition, after performing the MDP, an operation of transforming the mask data into pixel data before the exposure process. The pixel data is data directly used for actual exposure and may include data about a shape to be exposed to light and data about a dose allocated to each of the pieces of data about the shape. Here, the data about the shape may be bit-map data transformed from shape data, which is vector data, through rasterization etc.

After the exposure process, a series of processes are performed to complete a mask. The series of processes may include, for example, a development process, an etching process, a cleaning process, etc. In addition, the series of processes for mask manufacturing may include a measurement process and a defect inspection and repair process. In addition, a pellicle coating process may be included. Here, the pellicle coating process may indicate a process of attaching pellicles to protect the surface of a mask from possible contamination during mask delivery and a mask available life span after confirming through final cleaning and inspection that there are no contamination particles and chemical stains.

The mask manufacturing method of the present embodiment may include a lithography model generating method based on deep learning. Specifically, the mask manufacturing method of the present embodiment may generate a lithography model through a basic image data preparation operation, a transform image data preparation operation, a lithography model calculation operation by performing deep learning, a lithography model verification operation, and a recipe adjustment operation. Accordingly, the mask manufacturing method of the present embodiment may accurately generate an OPCed layout image based on the lithography model generating method based on deep learning. As a result, the mask manufacturing method of the present embodiment may manufacture a reliable mask capable of accurately forming a required pattern on a semiconductor device based on an accurate OPCed layout image.

According to embodiments, at least one processor and memory storing computer instructions may be provided. According to embodiments, the computer instructions, when executed by the at least one processor, may perform any number of functions described in the present disclosure including, for example, the operations of the methods described with reference to FIGS. 1 and 9.

While non-limiting example embodiments of the present disclosure have been particularly shown and described with reference to the drawings, it will be understood that various changes in form and details may be made to the example embodiments without departing from the spirit and scope of the present disclosure.

What is claimed is:

1. A lithography model generating method based on deep learning, the lithography model generating method comprising:

preparing basic image data for learning;

preparing transform image data that indicates a mask bias variation;

generating a lithography model by performing deep learning by combining the basic image data and the transform image data; and verifying the lithography model, wherein the transform image data is image data transformed from the basic image data such that the transform image data indicates a process variation.

2. The lithography model generating method of claim 1, wherein the transform image data is generated from the basic image data through an image augmentation method.

3. The lithography model generating method of claim 2, wherein the image augmentation method comprises at least one from among transformation of rotation, symmetry, enlargement, reduction, and translation.

4. The lithography model generating method of claim 1, wherein the process variation includes a variation of at least one from among a dose, a focus, and an anchor pattern.

5. The lithography model generating method of claim 1, wherein the deep learning is performed by applying a weight to the basic image data and the transform image data while changing a combination of a number of pieces of the basic image data and a number of pieces of the transform image data used as input data for each iteration of the deep learning.

6. The lithography model generating method of claim 1, wherein the deep learning is performed using deep convolutional generative adversarial networks (DCGAN).

7. The lithography model generating method of claim 1, further comprising:

adjusting a recipe with respect to the lithography model, wherein the verifying of the lithography model comprises:

proceeding to the adjusting of the recipe based on a set condition being satisfied, and proceeding to the generating of the lithography model based on the set condition not being satisfied.

8. The lithography model generating method of claim 7, wherein the lithography model is an optical proximity correction (OPC) model, or a process proximity correction (PPC) model, and wherein the set condition is whether an error root mean square (RMS), of a comparison of image data output from the lithography model with reference image data, is less than a set value.

9. The lithography model generating method of claim 1, wherein the basic image data is data with respect to an after develop inspection (ADI) contour image.

10. A lithography model generating method based on deep learning, the lithography model generating method comprising:

preparing basic image data for learning;

preparing transform image data that indicates a mask bias variation;

generating a lithography model by performing deep learning by combining the basic image data and the transform image data;

verifying the lithography model; and adjusting a recipe with respect to the lithography model, wherein the transform image data is generated through an image augmentation method from the basic image data such that the transform image data indicates a process variation.

11. The lithography model generating method of claim 10, wherein the process variation includes a variation of at least one from among a dose, a focus, and an anchor pattern.

12. The lithography model generating method of claim 10, wherein the deep learning is performed using deep convolutional generative adversarial networks (DCGAN), and wherein the deep learning is performed by applying a weight while changing a combination of a number of pieces of the basic image data and a number of pieces of the transform image data used as input data for each iteration of the deep learning.

13. The lithography model generating method of claim 10, wherein the verifying of the lithography model comprises:

proceeding to the adjusting of the recipe based on a set condition being satisfied, and proceeding to the generating of the lithography model based on the set condition not being satisfied.

14. The lithography model generating method of claim 10, wherein the image augmentation method comprises using at least one from among transformation of rotation, symmetry, enlargement, reduction, and translation.

15. A mask manufacturing method comprising:

generating a lithography model based on deep learning;

generating an optical proximity correction (OPC) ed layout by performing OPC on a mask layout by using an OPC model obtained based on the lithography model;

transferring the OPCed layout as mask tape-out (MTO) design data;

preparing mask data based on the MTO design data; and exposing a substrate for a mask based on the mask data, wherein the generating of the lithography model comprises:

preparing basic image data for learning;

preparing transform image data that indicates a mask bias variation;

generating the lithography model by performing deep learning by combining the basic image data and the transform image data;

verifying the lithography model; and adjusting a recipe with respect to the lithography model, wherein the lithography model comprises an optical proximity correction (OPC) model or a process proximity correction (PPC) model, and wherein the transform image data is image data transformed from the basic image data such that the transform image data indicates a process variation.

16. The mask manufacturing method of claim 15, wherein the transform image data is generated from the basic image data such that the transform image data indicates the process variation through an image augmentation method.

17. The mask manufacturing method of claim 16, wherein the process variation includes a variation of at least one from among a dose, a focus, and an anchor pattern.

18. The mask manufacturing method of claim 16, wherein the deep learning is performed using deep convolutional generative adversarial networks (DCGAN), and wherein the deep learning is performed by applying a weight while changing a combination of a number of pieces of the basic image data and a number of pieces of the transform image data used as input data for each iteration of the deep learning.

19. The mask manufacturing method of claim 16, wherein the verifying of the lithography model comprises:

proceeding to the adjusting of the recipe based on a set condition being satisfied, and proceeding to the generating of the lithography model based on the set condition not being satisfied.

\* \* \* \* \*